(12) United States Patent
Shoup et al.

(10) Patent No.: US 9,739,611 B2
(45) Date of Patent: Aug. 22, 2017

(54) AIRCRAFT INSTRUMENTATION MODULE

(71) Applicant: Mid-Continent Instruments Co., Inc., Wichita, KS (US)

(72) Inventors: Cary Allen Shoup, Wichita, KS (US); Brett Alan Williams, Andover, KS (US)

(73) Assignee: Mid-Continent Instruments Co., Inc., Wichita, KS (US)

( * ) Notice: Subject to any disclaimer, the term of this patent is extended or adjusted under 35 U.S.C. 154(b) by 141 days.

(21) Appl. No.: 14/503,753

(22) Filed: Oct. 1, 2014

(65) Prior Publication Data

US 2015/0116345 A1 Apr. 30, 2015

Related U.S. Application Data

(60) Provisional application No. 61/888,894, filed on Oct. 9, 2013.

(51) Int. Cl.
| | |
|---|---|
| *G08B 21/00* | (2006.01) |
| *G01C 5/06* | (2006.01) |
| *G09G 1/28* | (2006.01) |
| *G01C 23/00* | (2006.01) |
| *G06F 3/14* | (2006.01) |
| *G09G 5/00* | (2006.01) |

(52) U.S. Cl.
CPC ............ *G01C 5/06* (2013.01); *G01C 23/00* (2013.01); *G09G 1/285* (2013.01); *G06F 3/1423* (2013.01); *G09G 5/00* (2013.01); *G09G 2320/0606* (2013.01); *G09G 2320/0626* (2013.01); *G09G 2320/0666* (2013.01); *G09G 2340/0492* (2013.01); *G09G 2354/00* (2013.01); *G09G 2360/144* (2013.01); *G09G 2380/12* (2013.01); *Y10T 29/49002* (2015.01)

(58) Field of Classification Search
CPC .... G09G 1/285; G08G 5/0008; G08G 5/0021; G01C 23/00; G01C 5/06
USPC .......................................... 340/945; 701/14
See application file for complete search history.

(56) References Cited

U.S. PATENT DOCUMENTS

| | | | | |
|---|---|---|---|---|
| 4,551,657 A | * | 11/1985 | Miller .................... | G09G 1/285 345/14 |
| 8,212,650 B2 | * | 7/2012 | Tsern .................... | G06F 1/1626 340/539.11 |
| 8,736,465 B2 | * | 5/2014 | Rutherford .......... | G08G 5/0008 340/945 |

* cited by examiner

*Primary Examiner* — John A Tweel, Jr.
(74) *Attorney, Agent, or Firm* — Spencer Fane LLP

(57) ABSTRACT

A substantially self-contained digital instrumentation module (30) for fixed and rotary wing aircraft provides flight and other situational information, such as attitude, altitude, airspeed, and slip information, during normal aircraft operation or during emergencies, such as a failure of the aircraft's primary instrumentation. The module (30) can be mounted in any of various possible orientations. It includes redundant memories (38,40,50,52) to preserve back-up copies of software and settings during upgrades and changes. It partitions certified software from non-certified software. It can receive software upgrades and settings changes via a common portable memory device. It can automatically calculate and synchronize barometric pressure with the aircraft's primary instrumentation. It also allows for creating a customizable dimming curve (220,222), and for creating customizable range markings (114).

9 Claims, 8 Drawing Sheets

AIRCRAFT INSTRUMENTATION MODULE

RELATED APPLICATION

The present U.S. non-provisional patent application claims priority of a filed provisional patent application titled AIRCRAFT INSTRUMENTATION MODULE, Ser. No. 61/888,894, filed Oct. 9, 2013. The earlier-filed application is hereby incorporated by reference into the present application as though fully set forth herein.

FIELD OF INVENTION

The present invention relates to aircraft instrumentation. More specifically, the present invention concerns a substantially self-contained digital instrumentation module operable for fixed and rotary wing aircraft that provides flight and other situational information of aircraft conditions, such as attitude, altitude, airspeed, and slip information, during normal aircraft operation or during emergencies, such as a failure of the aircraft's primary instrumentation.

BACKGROUND

Aircraft, both fixed-wing and rotary wing, have primary instruments that provide information to their pilots and crew members regarding flight or other situational information of aircraft conditions, such as attitude, altitude, airspeed, and slip. Because primary instruments can fail, aircraft often have back-up instruments.

In general, such back-up instruments have limited functionality and operate only when the primary instruments fail. They must be mounted within the aircraft in a particular location and orientation in order to operate properly, regardless of the practicalities of the cockpit or the preferences of the pilot or crew. They can be rendered inoperable if upgrades to software or changes to settings are written over the onboard software or settings and are interrupted before they are completed. Updating onboard software can require that the back-up instruments be removed from the aircraft and returned to the manufacturer. Because the ARINC 429 data transfer standard used in aircraft does not assign a data label to barometric pressure, direct communication of barometric pressure data from primary instruments to back-up instruments is not possible, thereby requiring that the pilots or crew members manually enter barometric pressure data. Displays have minimally adjustable brightness levels, which are either directly determined by the aircrafts' lighting buses or manually adjusted by the pilots or crewmembers. Though they use color-coding to indicate operational ranges, such as safe (often indicated by green), warning (yellow), and unsafe (red), existing back-up instruments have fixed color-coding, and in newer back-up instruments it is selectable solely based on aircraft type. More, specifically, users identify their aircraft type to the instruments, and the instruments responds by adjusting the color coding to reflect the operational ranges for the identified aircraft type. Unfortunately, this requires that the operational ranges of all possible aircraft types be stored onboard the back-up instruments, which can be impractical and, furthermore, does not accommodate users' preferences.

SUMMARY OF THE INVENTION

The present invention addresses the above-identified and other concerns by providing a substantially self-contained digital instrumentation module operable for fixed or rotary wing aircraft that provides flight and other situational information of aircraft conditions, such as attitude, altitude, airspeed, and slip information, during normal aircraft operation or during emergencies. The module can operate as back-up instrumentation in the event of, for example, a failure of the aircraft's primary instrumentation; the module has its own displays and battery power and is otherwise capable of operating alongside and supplementing the primary instrumentation during normal operation.

In one embodiment of the present invention, the module may comprise an electronic display screen displaying an electronic indicator of at least one aircraft condition, the electronic display screen having an actual mounting orientation selected from among a plurality of selectable mounting orientations within the aircraft, and the electronic indicator having an actual display orientation selected from among a plurality of selectable display orientations on the electronic display; and a manual control device allowing manual selection of the actual display orientation of the electronic indicator from among the plurality of selectable display orientations so that the actual display orientation of the electronic indicator corresponds to the actual mounting orientation of the electronic display screen.

In various implementations, this embodiment may include any one or more of the following additional features. The plurality of selectable mounting orientations may include horizontal and vertical. The module may include first and second electronic display screens, wherein in one of the plurality of selectable mounting orientations the first electronic display screen is positioned horizontally adjacent to the second electronic display screen, and in the other of the plurality of selectable mounting orientations the first electronic display screen is positioned vertically adjacent to the second electronic display screen; first and second electronic indicators having an actual display orientation selected from among a plurality of selectable display orientations on the first and second electronic displays, wherein one of the first and second electronic indicators is displayed on one of the first and second display screens and the other of the first and second electronic indicators is displayed on the other of the first and second display screens, wherein the manual control device allows manual selection of which of the first and second electronic indicators is displayed on which of the first and second display screens, and the actual display orientation of the first and second electronic indicators on the first and second display screens. The manual control device may consist of a pushable and turnable knob receiving manual input by being pushed and/or turned.

In another embodiment of the present invention, the module may be operable to store data, and the module may comprise a first internal memory storing a first copy of the data; a second internal memory storing a second copy of the data; an interface facilitating a change to the first copy of the data; and a decision-making component deciding whether the change to the first copy of the data was completed, and if the change to the first copy of the data was completed, writing the first copy of the data over the second copy of the data, and if the change to the first copy of the data was not completed, writing the second copy of data over the first copy of the data.

In various implementations, this embodiment may include any one or more of the following additional features. The first and second internal memories may be first and second internal memory spaces on a single physical device, or they may be first and second internal memory spaces on different physical devices. The module may include a first external memory storing a third copy of the data; a second external memory storing a fourth copy of the data; a second interface facilitating a change to the third copy of the data; and a second decision-making component deciding whether the change to the third copy of the data was completed, and if the change to the third copy of the data was completed, writing the third copy of the data over the fourth copy of the data, and if the change to the third copy of the data was not completed, writing the fourth copy of the data over the third copy of the data. The first and second external memories may be part of a cable harness installed in the aircraft and connecting the module to the aircraft. The data may include information specific to the aircraft in which the cable harness is installed, and the module may include a third decision-making component deciding whether the module has been disconnected from the aircraft, and if the module has been disconnected form the aircraft, deciding whether the information specific to the aircraft and stored in the first and second internal memories corresponds to the information specific to the aircraft and stored in the first and second external memories, and if the information specific to the aircraft and stored in the first and second internal memories does not correspond to the information specific to the aircraft and stored in the first and second external memories, writing the third copy of the data over the first and second copies of the data.

In another embodiment of the present invention, the module may comprise a first internal memory storing certified software, wherein the certified software has been certified for use in the aircraft; and a second internal memory storing non-certified software, wherein the non-certified software has not been certified for use in the aircraft, wherein the certified software is partitioned from the non-certified software.

In various implementations, this embodiment may include any one or more of the following additional features. The first and second internal memories may be first and second internal memory spaces on a single physical device, or they may be first and second internal memory spaces on different physical devices. The module may not allow the non-certified software to be executed during flight.

In another embodiment of the present invention, the module may comprise an internal memory storing old software for use in the aircraft; and an interface allowing the internal memory to communicate with a portable memory device, wherein the portable memory device is operable to store new software for use in the aircraft, the interface receiving the new software from the portable memory device, and writing the new software over the old software in the internal memory of the instrumentation module.

In one implementation, the interface may be a USB port and the portable memory device may be a USB-based device.

In another embodiment of the present invention, the module may comprise an interface connecting the module to a primary instrumentation system of the aircraft, wherein the primary instrumentation system determines a first altitude and a barometric pressure and, based thereon, calculates a first barometrically-corrected altitude; an altitude-determining component determining a second altitude, wherein the second altitude is approximately the same as the first altitude; a first calculating component receiving the first altitude and the first barometrically-corrected altitude from the primary instrumentation system via the interface, and, based thereon, calculating the barometric pressure; and a second calculating component receiving the second altitude and the calculated barometric pressure and calculating a second barometrically-corrected altitude, wherein the second barometrically-corrected altitude is approximately the same as the first barometrically-corrected altitude.

In an implementation of this embodiment, the module may further include a manual control device receiving manual input regarding the barometric pressure, wherein the manual input regarding the barometric pressure is used instead of the calculated barometric pressure.

In another embodiment of the present invention, the module may comprise an electronic display screen displaying an electronic indicator of at least one aircraft condition, and having a brightness level; an illumination sensor sensing an illumination level within the aircraft; a memory storing a plurality of brightness level values for the electronic display screen; a brightness controlling component substantially automatically changing the brightness level of the electronic display screen in response to a change in the illumination level sensed by the illumination sensor by selecting a corresponding brightness level value from the memory.

In various implementations, this embodiment may include any one or more of the following additional features. The illumination sensor may be a photocell, and the photocell may be mounted in a surface of the module. The module may further include a manual control device allowing a user to manually set the plurality of brightness level values. The memory may store multiple brightness level values in the form of a brightness level curve. The module may include an interface allowing a user to download multiple brightness level values from a portable memory device. The plurality of brightness level values may be stored in the memory during a factory configuration of the module. The module may include a manual control device allowing a user to override the downloaded or factory-configured plurality of brightness level values by manually setting at least one of the plurality of brightness level values.

In another embodiment of the present invention, the module may comprise an electronic display screen displaying an electronic indicator of a condition of the aircraft, the electronic indicator including a current value for the condition of the aircraft and a range of possible values for the condition of the aircraft, and a bar extending alongside the range of possible values for the condition of the aircraft, wherein the bar includes a plurality of colors, each color being associated with and communicating information about a sub-range of the range of possible values for the condition of the aircraft; and a manual control device allowing a user to manually choose the plurality of colors and to determine a position of each color within the bar to correspond to a particular sub-range of the range of possible values for the condition of the aircraft.

In various implementations, this embodiment may include any one or more of the following additional features. The manual control device may consist of a pushable and turnable knob operable to receive input by being pushed or turned. The module may include an interface allowing the user to download the plurality of colors and the positions of each color from a portable memory device. The module may include a memory containing the plurality of colors and the position of each color stored during a factory configuration of the module. The module may include a manual control device allowing the user to override the downloaded or factory-configured plurality of colors and the position of each color by manually setting at least one of the plurality of colors and the position of at least one of the plurality of colors. The manual control device may allow the user to manually choose the plurality of colors and to determine the position of each color within the bar based on a consideration, such as personal preference, that is substantially independent of a type of the aircraft.

These and other features of the present invention are discussed in greater detail in the section below entitled DETAILED DESCRIPTION.

BRIEF DESCRIPTION OF THE DRAWINGS

The present invention is described herein with reference to the following drawing figures, which are not necessary to scale.

DETAILED DESCRIPTION

Figure 1:
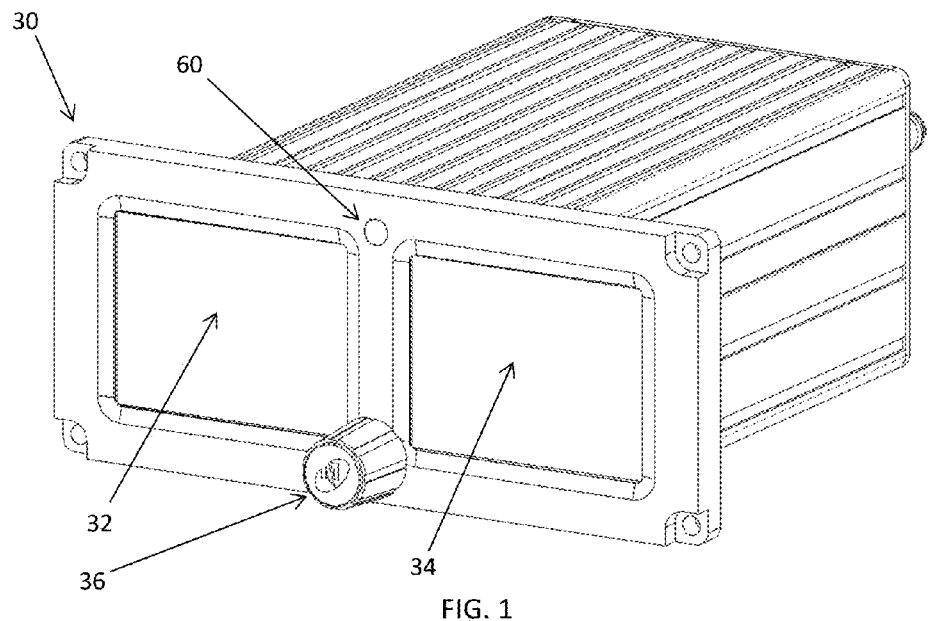
FIG. 1 is an isometric view of an embodiment of the aircraft instrumentation module of the present invention.
Figure 2:
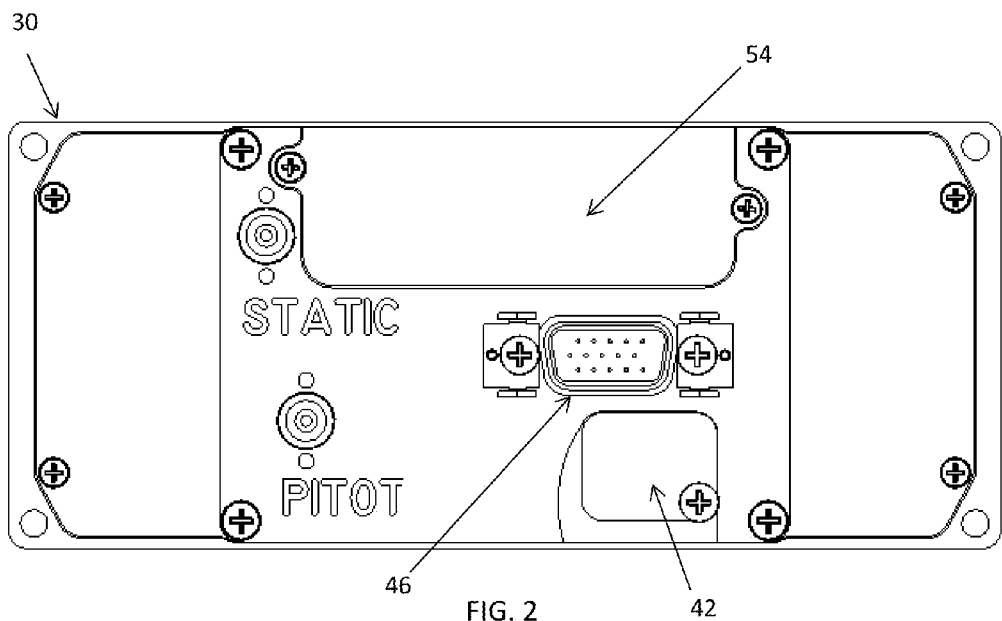
FIG. 2 is a rear elevation view of the module of FIG. 1.
Figure 3:
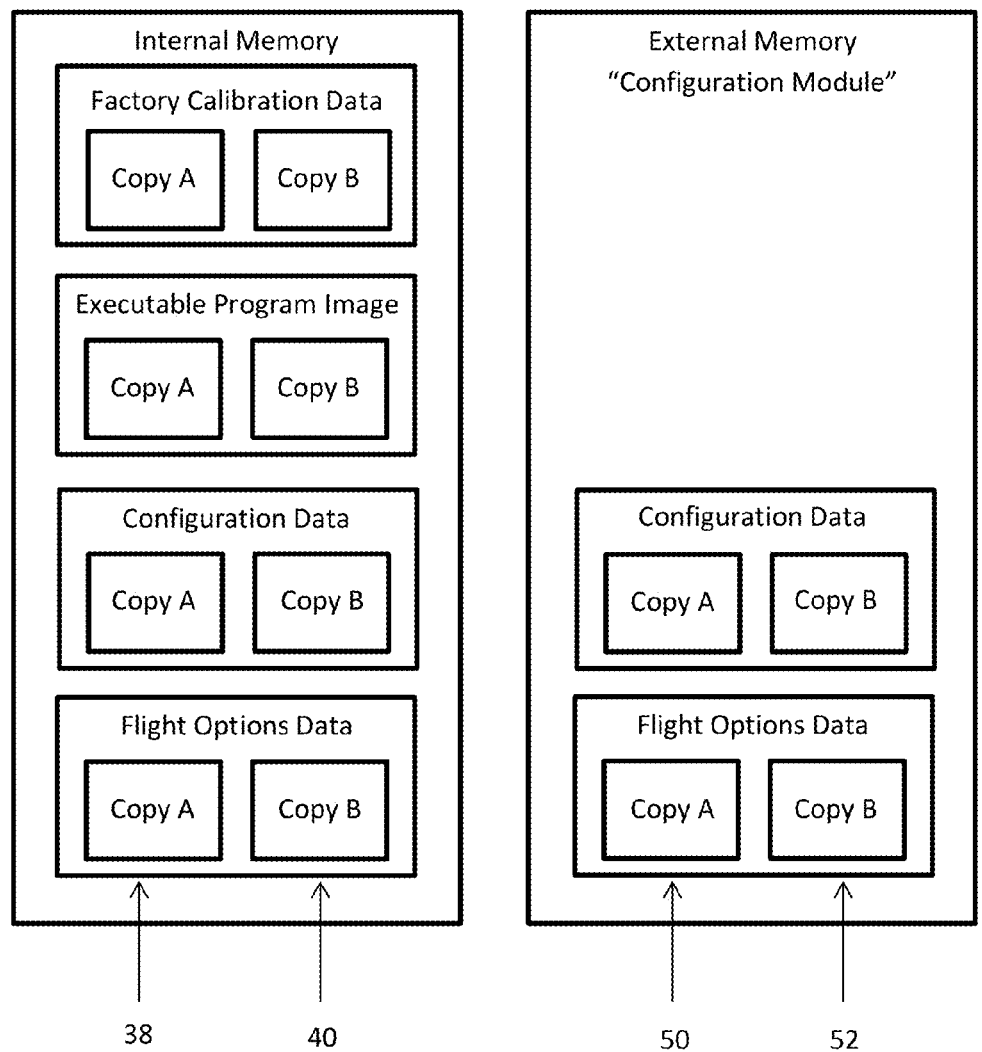
FIG. 3 is a block diagram of internal memories contained within the module of FIG. 1 and external memories contained within a cable harness that connects the module to an aircraft's primary systems.
Figure 4:
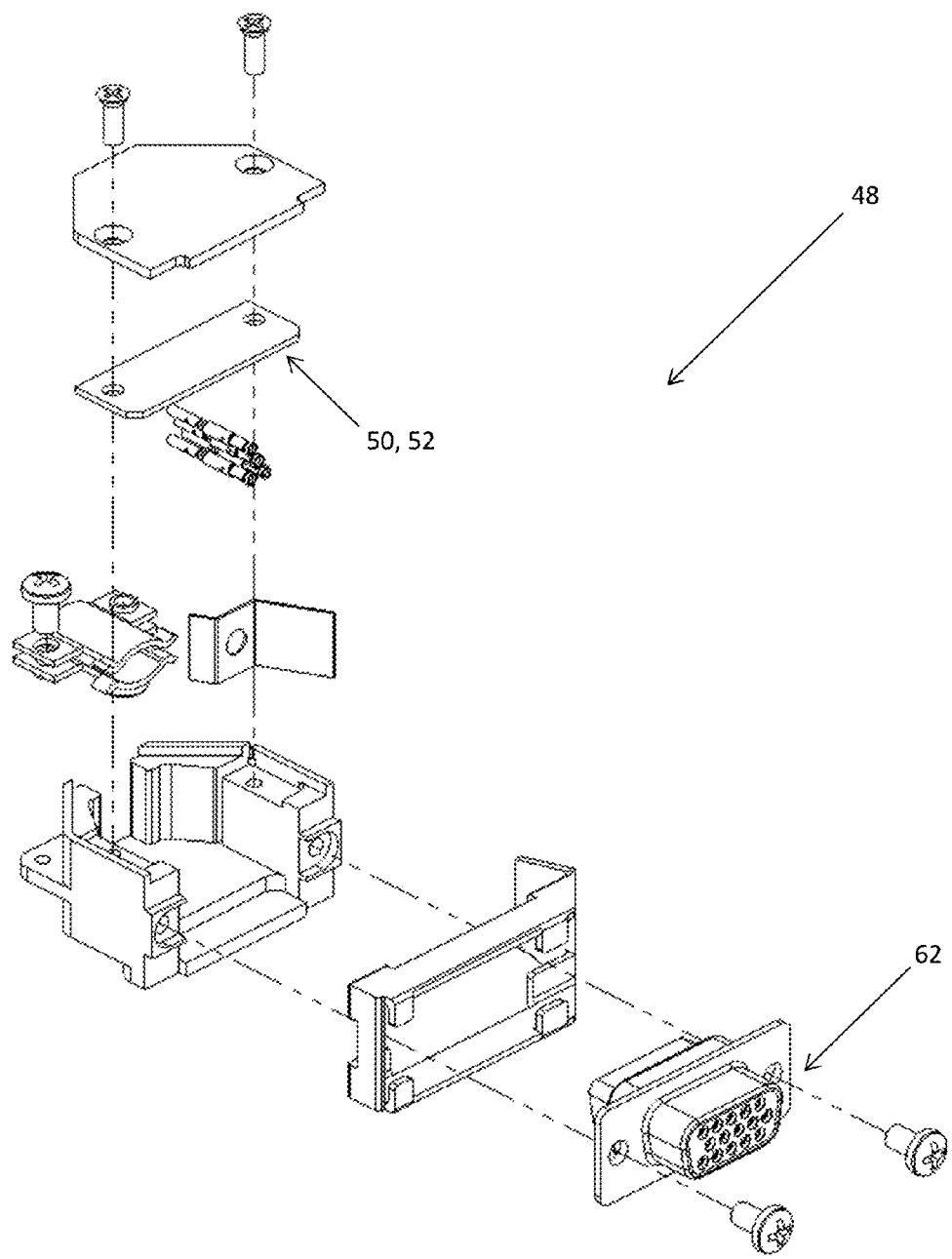
FIG. 4 is an exploded isometric view of the cable harness.

With reference to the figures, an aircraft instrumentation module 30 is herein described, shown, and otherwise disclosed in accordance with one or more embodiments of the present invention, including one or more preferred embodiments. Generally, the module 30 is a substantially self-contained digital instrumentation module operable for fixed or rotary wing aircraft that provides flight and other situational information of aircraft conditions, such as attitude, altitude, airspeed, and slip information, during normal aircraft operation or during emergencies. Although the module 30 can operate as back-up instrumentation in the event of, for example, a failure of the aircraft's primary instrumentation, the module 30 has its own displays and battery power and is otherwise capable of operating alongside and supplementing the primary instrumentation during normal operation.

In various embodiments, the module 30 provides several advantageous features, including the following. It can be mounted in any of various possible orientations, thereby accommodating cockpit practicalities and pilot preferences. It includes redundant memories to preserve back-up copies of software and settings during upgrades and changes, thereby avoiding problems associated with interrupted data transfers. It partitions certified software from non-certified software. It can receive software upgrades and settings changes via a common portable memory device, thereby reducing the need to remove and send the module to its manufacturer for upgrades. It can calculate and synchronize barometric pressure with the aircraft's primary instrumentation, thereby minimizing the need to manually set the barometric pressure. It allows for creating a customizable dimming curve, thereby enhancing visibility and safety, and it allows for creating customizable range markings, thereby enhancing recognizability and safety.

Physical Aspects

The module 30 can be installed in existing or new aircraft, such as Part 23 and 25 fixed-wing airplanes and Part 27 and 29 rotary craft. Its relatively small size, broadly selectable orientation, and extra-wide viewing angle allow for installing it almost anywhere in, on, or near the aircraft's instrument panel. Referring to FIGS. 1, 2, 3, and 4, the module 30 broadly comprises first and second displays 32,34, a control knob 36, first and second internal memories 38,40, a port interface 42 for communicating with a common portable memory device, a connector interface 46 for communicating with a cable harness 48, first and second external memories 50,52 associated with the cable harness 48, and an internal battery 54. Though not shown in the figures, it will be appreciated that the module 30 further comprises one or more electronic components operable to receive input signals, make calculations and decisions based on programmed instructions, and produce output signals, as well as several solid-state electronic sensors for sensing or measuring various flight conditions.

Figure 5:
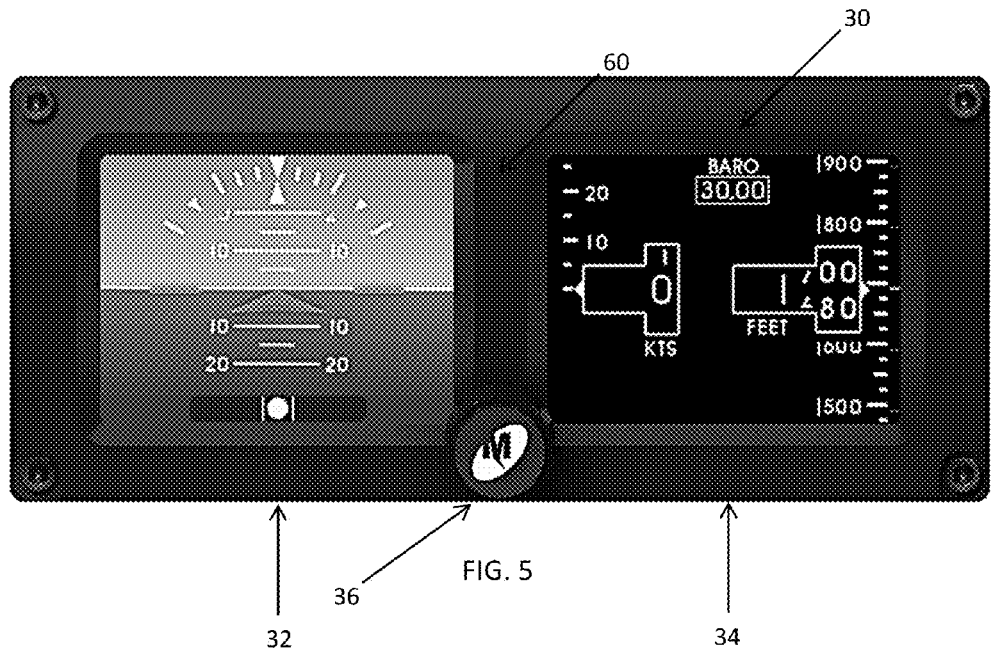
FIG. 5 is a front elevation view of the module of FIG. 1 in operation, wherein the module is oriented horizontally and with a control knob located at the bottom.
Figures 6, 7:
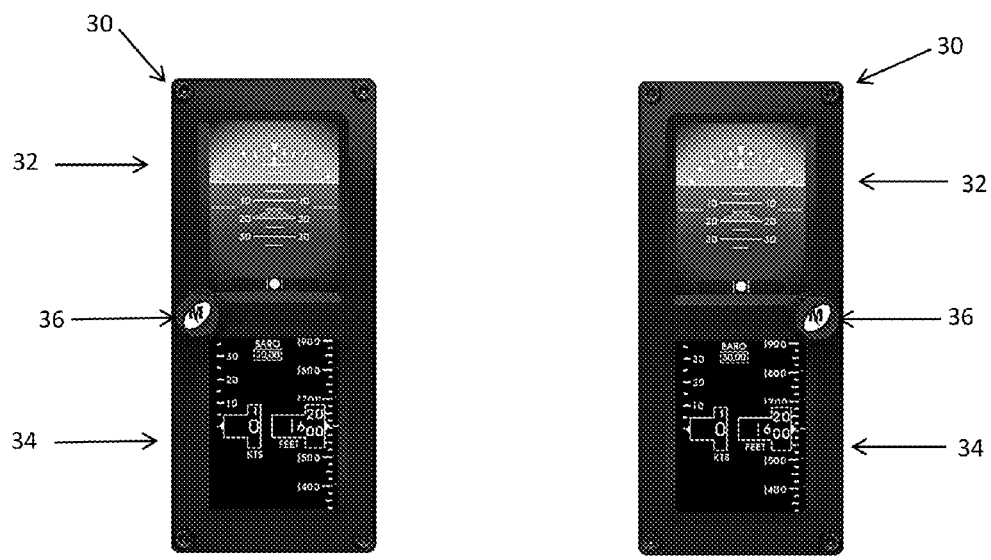
FIG. 6 is a front elevation of the module of FIG. 1, wherein the module is oriented vertically and with the control knob located on the right.
FIG. 7 is a front elevation view of the module of FIG. 1, wherein the module is oriented vertically and with the control knob located on the left.

Depending on the module's installation orientation, the displays 32,34 may be positioned horizontally adjacent to each other, as shown in FIG. 5, or vertically adjacent to each other, as shown in FIGS. 6 and 7. The displays 32,34 employ smooth graphics, daylight-readable brightness, and a configurable lighting response curve for optimal visibility under diverse conditions, and have an extra-wide viewing angle for enhanced viewability. In one implementation, the displays 32,34 are high-resolution LCD displays.

Depending on the module's installation orientation, the control knob 36 can be located at the bottom-center (as shown in FIG. 5), top center (not shown), middle-left (FIG. 6), or middle-right (FIG. 7) of the front of the module 30. The control knob 36 allows a user to interface with the module 30, including providing input and navigating through and selecting from the menu and sub-menu screens and options which are discussed below in detail. In one implementation, the control knob 36 has both push and turn functionality, has 16 detents per 1 revolution, and, in use, typically increments whatever element it is controlling on the display at a rate of 1 unit per detent. The push function may be used, for example, to enter and exit menus and sub-menus, select highlighted options, and control functions. The push function may also perform certain operations with a push-and-hold action. The turn function may be used, for example, to increment values and move between menus, sub-menus, and other choices. In one implementation, the control knob 36 may be the only manual interface provided on the module 30—i.e., no other knobs, buttons, switches, or other such manual interface mechanisms, either physical or virtual, are provided.

The first and second internal memories 38,40 allow for redundant information storage. The memories 38,40 may be implemented as first and second physical devices, as first and second spaces within a single physical device, or as any combination thereof. It will be appreciated that it sometimes happens with electronic devices that upgrades to software or changes to settings are interrupted, which can result in the devices being inoperable until the software upgrade or setting change is reinitiated and fully completed. The present invention avoids such a result by storing two copies of some or all of the module's software and settings. When the process of changing the software or settings is initiated, only the information stored in the first internal memory 38 is affected until the change is fully completed. If the change to the copy of the software or settings in the first internal memory 38 is interrupted for any reason, the module 30 reverts to the unaffected copies in the second internal memory 40. If such a condition occurs, the module 30 may communicate a warning message that the upgrade or change was unsuccessful. If the change is fully completed, the copy of the software or settings in the second internal memory 40 is overwritten to reflect the copy of the newly changed software in the first internal memory 38. This advantageously avoids a situation in which the module 30 becomes inoperable due to the interruption of a routine data transfer.

The port interface 42 for communicating with the portable memory device facilitates quickly and easily upgrading or otherwise changing software or settings in the internal memories 38,40 and external memories 50,52 (which are discussed below). In one implementation, the port interface 42 is a USB port and the portable memory device is a common USB flash drive. The portable memory device is operable to contain new software to upgrade the old software stored in the internal memories 38,40 and/or the external memories 50,52. Thus, this feature advantageously facilitates the use of the portable memory device to maintain and upgrade the module's software without requiring that the module 30 be returned to the manufacturer and, in some cases, without even removing it from the instrument panel.

In one embodiment, the internal battery 54 is a lithium ion battery which automatically recharges from the aircraft's primary power system during normal flight. The module 30 or the battery 54 itself may further include a heater for warming the battery 54 during low temperature operating conditions. In one implementation, the battery 54 can provide operating power for at least approximately between 1 and 4 hours, or approximately between 2 and 3 hours, after primary power is lost. The battery 54 can be replaced in the field with minimal effort by opening or removing a rear battery cover from the module 30, removing the old battery, inserting the new battery, and closing or replacing the cover.

The module 30 can be installed in, on, or near the instrument panel of the aircraft. It can also be installed in other locations depending on the specific application and with the appropriate installation certification. The module 30 should be mounted so that its longitudinal axis is oriented parallel to the direction of flight, but, as shown in FIGS. 5,6, and 7, can otherwise be mounted with the longitudinal axis horizontal or vertical. During configuration of the module 30, the display orientation can be selected to match the desired physical installation, as discussed below. Installation considerations include whether the body of the module 30 or use of the control knob 36 will impede the pilot's view of any primary instrument display and whether there is sufficient clearance for the body of the module 30 as well as the electrical and pneumatic connections and routing.

In various implementations, the module 30 weighs approximately between 0.5 and 2.5 pounds, or approximately between 1 and 2 pounds, or approximately 1.6 pounds; has a bezel measuring approximately 1 to 4 inches by 4 to 7 inches by 0.1 to 0.5 inches, or approximately 2 to 3 inches by 5 to 6 inches by 0.2 to 0.4 inches, or approximately 2.37 inches by 5.50 inches by 0.33 inches; has a chassis measuring approximately 1 to 4 inches by 2 to 5 inches by 3 to 6 inches, or approximately 2 to 3 inches by 3 to 4 inches by 4 to 5 inches, or approximately 2.31 inches×3.16 inches×4.82 inches (not including connectors, mates, and the knob 36); and has one or more 15-pin D-subminiature connectors 46.

In one implementation, the module 30 accepts input power of approximately between 5 and 40 VDC, or approximately between 10 and 32 VDC, and draws approximately between 1 (during normal operation) and 30 (while, e.g., charging or heating the battery) W, or approximately between 6 and 25 W, and so is connectable to aircraft electrical buses providing voltage and amperage in those ranges, such as buses providing between 14 and 28 VDC. The module 30 accepts input power for lighting of various voltages, such as 5, 14, or 28 VDC, and includes a photocell 60 or other light sensor for sensing ambient lighting conditions and, based thereon, substantially automatically adjusting the module's illumination level.

The module 30 receives power and interfaces with the primary instrumentation via the cable harness 48. Once installed in the aircraft, the cable harness 48 remains therein even if the module 30 is subsequently removed. In one form, the cable harness 48 may include various wires attached to an electrical connector 62 (e.g., a 15-pin D-subminiature connector), wherein the module 30 presents the corresponding connector 46 to interface therewith, and the first and second external memories 50,52. The cable harness' external memories 50,52 function like the internal memories 38,40 to redundantly store information. More specifically, when the process of changing the module's software or settings is initiated, only the information stored in the first external memory 50 is affected until the change is fully completed. If the change to the copy of the software or settings in the first external memory 50 is interrupted for any reason, the module 30 reverts to the unaffected copies in the second external memory 52. If the change is fully completed, the copy of the software or settings in the second external memory 52 is overwritten to reflect the copy of the newly changed software in the first external memory 50. In certain situations in which the software or settings stored in the external memories 50,52 conflict with the software or settings stored in the internal memories 38,40, those stored in the external memories 50,52 are considered correct and written into the internal memories 38,40. For example, when a different module 30 is connected to an existing cable harness 48, the internal memories 38,40 are assumed to contain settings for an aircraft in which the module 30 was previously installed and the external memories 50,52 are assumed to contain the correct settings for the current aircraft, so the settings contained in the external memories 50,52 are written over the settings contained in the internal memories 38,40. If such a condition occurs, the module 30 may communicate a warning message that the memories 38,40,50,52 contained conflicting information and that the internal memories 38,40 were overwritten.

Thus, the module 30 may include first and second internal memories 38,40 within the module 30 and first and second external memories 50,52 within the cable harness 48, with each such memory 38,40,50,52 storing a separate copy of software or data and partitioning certified from non-certified software.

Functional Aspects

Figure 8:
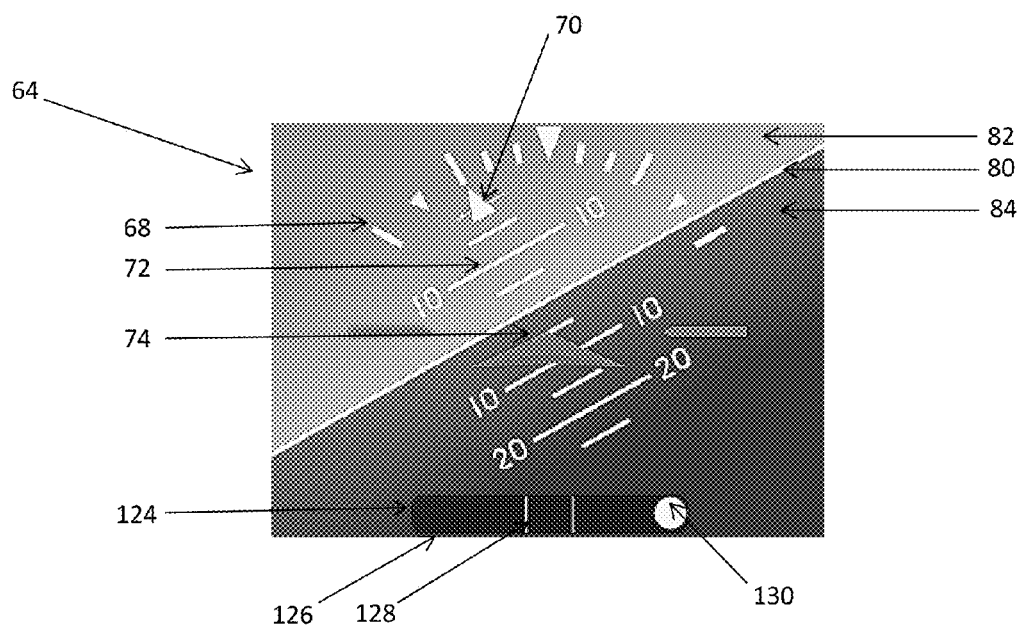
FIG. 8 is a screen capture of attitude and slip information shown on a first display of the module of FIG. 1.
Figure 9:
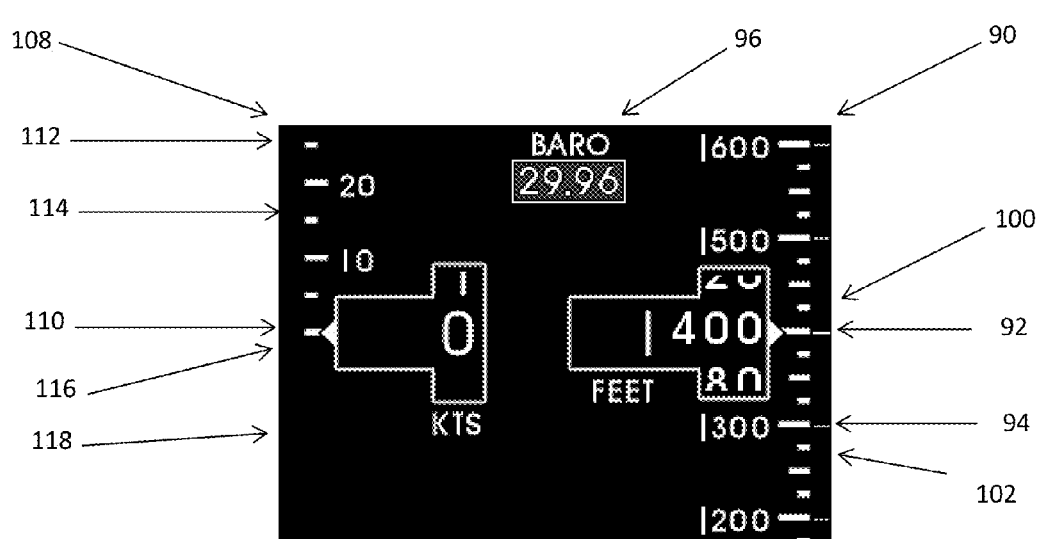
FIG. 9 is a screen capture of airspeed and altitude information shown on a second display of the module of FIG. 1.

The module 30 provides flight and other situational information. Referring also to FIGS. 8 and 9, in one implementation attitude and slip information is communicated on one of the first and second displays 32 or 34, and airspeed and altitude information is communicated on the other display 34 or 32.

An attitude indicator indicates the attitude of the aircraft, and includes a background, a roll scale 68, a roll pointer 70, a pitch scale 72, and a symbolic airplane 74. The background comprises a representative white horizon line 80 separating the "sky" 82 (which is colored blue) and "ground" 84 (which is colored brown). The roll scale 68 is depicted as an arc of gradations representing bank angles of 0, 10, 20, 30, 45, and 60 degrees. The roll scale 68 can be configured to be fixed to the sky/horizon or fixed to the top of the display. The module 30 is operable to perform in a continuous and unlimited roll range of 360+ degrees. The roll pointer 70, which may take the form of a triangle, is located below the roll scale 68 and represents the aircraft in relation to its bank angle. It is configured, by definition, to operate conversely to the behavior of the roll scale 68—i.e., a rotating roll scale 68 produces a fixed roll pointer 70 and a fixed roll scale 68 produces a rotating roll pointer 70. The pitch scale 72 is depicted as a series of gradations representing pitch angles in 5 degree increments, with every 10 degree increment being extended and numbered. The module 30 is operable to perform in a continuous and unlimited pitch range of 360+ degrees. A series of chevrons (^) appears overlaid on the pitch scale 72 when the aircraft is in an extreme pitch attitude, to indicate to the pilot the direction of the horizon for quick reference. The symbolic airplane 74 remains in the center of the display, with the background elements 80,82,84 moving behind it to represent the aircraft's relative position. The particular symbol 74 that represents the airplane can be changed during flight. The attitude indicator 64 portion of the display can be located in the right or left display 32,34 when the module 30 is mounted horizontally, but will generally be located in the top display when the module 30 is oriented vertically.

An altitude indicator 90 (or "altimeter") indicates the altitude of the aircraft, and includes an altitude window 92, an altitude tape 94, a barometer window 96, and an altitude trend bar 98. The altitude window 92 displays the current barometrically-corrected altitude. The altitude is communicated in increments of ten units, and the window 92 is expanded to display a minimum of twenty units. The units scroll, or "roll", to facilitate quick reference as to the increasing or decreasing nature of the aircraft's altitude. The hundreds, thousands, and ten-thousands digits appear to the left of the tens digits with the thousands and ten-thousand digits being slightly larger than the others. An altitude pointer 100 (triangle) to the right of the window 92 points to the position on the altitude tape 94 of the current altitude. Altitude units 102 appear below the altitude window 92 and can be changed during flight. The altitude tape 94 is a vertical scale along the right margin of the display. The current altitude is generally in the middle of the tape 94 and indicated by the triangular pointer 100 on the right side of the altitude window 92. The tape 94 has numeric gradations every 100 units with minor gradations every 50 units and sub-gradations every 25 units. In horizontal installations the tape 94 spans approximately 400 units from top to bottom, and in vertical installations the tape 94 spans approximately 500 units from top to bottom. The tape 94 rolls to facilitate quick reference as to the increasing or decreasing nature of the aircraft's altitude. The barometer window 96 shows the currently set barometric pressure, is located at the top center of the display, and is identified by the abbreviation "BARO". Setting the current barometric pressure allows for adjusting the altitude measurement based on the relevant environmental conditions. The barometric setting can be adjusted by simply turning the control knob 36 during flight. When adjusting the barometric pressure, the window 96 increases in size and the digits turn green. When finished setting the pressure, the window 96 returns to its original size and color. Barometric pressure units can be selected during flight.

The altitude trend bar 98 is located along the right margin of the altitude indicator 90. This feature is optional and can be turned on or off during flight. The trend bar 98 is magenta in color and originates at the current altitude on the altitude tape 94 (from the middle of the display, directly across from the altitude pointer 100). The height of the trend bar 98, above or below the current altitude, indicates the altitude of the aircraft on the altitude tape 94 if the current vertical speed, or "altitude trend", is maintained over a period of 6 seconds. For example, if the current altitude is approximately 9,315 feet, and the trend bar 98 is at approximately 9,325 feet, then the aircraft's altitude will be 9,325 feet in 6 seconds if the current vertical speed or climb is maintained. The length of the trend bar 98 will increase as the dive or climb rates increase, and will approach zero or disappear entirely when the vertical speed reaches zero in level flight. The altitude indicator 90 will generally appear on the right side of the airspeed/altitude display.

An airspeed indicator 108 communicates the current indicated airspeed (IAS), and includes an airspeed window 110, an airspeed tape 112, and airspeed limitations or range markings 114. The digits are enlarged for easier visibility and increment by 1 unit. Airspeed units roll to facilitate quick reference as to the increasing or decreasing nature of the aircraft's airspeed. An airspeed pointer 116 (which may take the form of a triangle) to the left of the window 110 points to the associated position on the airspeed tape 112 of the current airspeed. The airspeed units 118 appear below the airspeed window 110 and can be selected during installation of the module 30. The airspeed tape 112 is a vertical scale along the left margin of the display. The current airspeed is generally in the middle of the tape 112 and indicated by the pointer 116 on the left side of the airspeed window 110. The airspeed tape 112 has numeric indications every 10 or 20 units depending on the selected airspeed units 118. Minor gradations appear every 5 or 10 units, respectively. In horizontal installations the tape 112 spans approximately 50 or 100 units from top to bottom, and in vertical installations the tape 112 spans approximately 80 or 160 units from top to bottom depending on the type of module 30. The airspeed tape 112 rolls to facilitate quick reference as to the increasing or decreasing nature of the aircraft's airspeed. The range markings 114, or "V-speeds", are indicated with colored bands placed vertically along the left margin next to the airspeed tape 112. The colors and values of each bar can be set during installation of the module 30. Colors should be selected based on industry-defined colors and V-speed limits as defined by the aircraft's specific Pilot's Operating Handbook (POH). Range markings 114 are represented by full-width bars, half-width bars, and/or radial marks. A traditional "barber pole" may also be displayed, and provides the appropriate Vne, Vmo, and/or Mmo values. The airspeed indicator 108 portion of the display will generally appear on the left side of the airspeed/altitude display.

A slip indicator 124 indicates sideways movement of the aircraft relative to the oncoming airflow. The slip indicator 124 is represented by a shaded translucent background 126 with two white vertical lines 128 around center and a yellow ball 130. When the ball 130 is maintained between the vertical lines 128 during banking maneuvers, the turn is considered to be coordinated without slip. The module 30 employs electronic damping of the ball's movement to prevent overly sensitive response and comply with regulatory requirements. The background 126 becomes semi-transparent if the roll scale 68 or roll pointer 70 pass behind the slip indicator 124 so that all other elements remain visible. The slip indicator 124 appears at the bottom of the attitude/slip display.

In one implementation, some or all of the software stored on or used by the module 30 is calibrated with reference to an orientation-determining device, such as an internal gyroscope, rather than with reference to a direction- or positioning-determining device, such as a GPS device or compass.

The module 30 is operable to receive input data, such as data relating to barometric pressure, and communicate output data, such as attitude, altitude, airspeed, and slip, using an appropriate data transfer standard such as the ARINC 429 standard. In one implementation, for example, the module 30 receives barometric data from the primary instrumentation, substantially automatically synchronizes itself to the primary instrumentation, and outputs barometrically-adjusted altitude data. More specifically, the primary instrumentation determines barometric pressure and uses that information to calculate the aircraft's actual altitude. The module 30 receives data from the primary instrumentation and uses that data to calculate barometric pressure in order to synchronize the module 30 with the primary instrumentation. The ARINC 429 communication standard does not assign a data label to barometric pressure and, therefore, does not support direct communication of barometric pressure data to secondary instrumentation. However, the primary instrumentation is able to communicate both altitude data and barometrically-corrected altitude data, and, based thereon, the module 30 calculates the barometric pressure used by the primary instrumentation and, thereafter, uses that same barometric pressure. This feature advantageously reduces pilot workload by eliminating the need to separately set both the primary instrumentation and the module 30 (as long as the primary instrumentation is operating).

In various implementations, values for certain colors, operational ranges, brightness levels, and other such variables can be manually set by the pilot or other crew member using the control knob 36, can be downloaded from the portable memory device via the port interface 42, or can be set by factory personnel prior to installation of the module 30. In implementations in which the values for such variables are downloaded or set at the factory, the pilot or other crew member may be allowed to override such prior settings using the control knob 36.

The module 30 allows the user to directly set the color coding and color coding ranges for its instrumentation, that is, the colors and operational ranges, such as the airspeed range markings 114. More specifically, rather than indirectly setting the color coding by simply identifying the aircraft's type to the module 30, the present invention allows the user to directly set the color coding based on the known operational ranges for the particular aircraft (and which are reflected in the color coding of the primary instrumentation). This allows the module 30 to be used in very different aircraft, such as single- and multi-engine fixed-wing and rotary aircraft, without requiring that memory space be devoted to storing the operational ranges for each of those aircraft, and allows greater flexibility for the user to customize the color coding based on his or her preferences or the limitations of a particular aircraft. Furthermore, this ability to directly set the color coding can be upgraded as needed, regarding, for example, colors or other aspects of the presentation, via the port interface 42 and the portable memory device.

The module 30 includes four modes of operation: Pre-Flight Mode, Flight Mode, Emergency Mode, and Configuration Mode. In some or all of these modes, the user is able to interface with the module 30 using the control knob 36 to select certain functions or set certain values. In such cases, available functions are indicated by a different color(s) than unavailable functions, and selected functions may be indicated by a different color(s) than unselected functions.

Pre-flight Mode is initiated when power is applied to the module 30. An introduction screen may appear on one or both displays 32,34, and include, for example, the manufacturer's logo, the model name and number, the software version(s), and the total amount of time that the module 30 has operated. The introduction screen may continue to be displayed while the module 30 conducts an initial power-up built-in test (PBIT) of itself to validate its operational readiness. The PBIT test may include, for example, a battery capacity measurement, a test to verify software and memory, and a check that the internal settings and module identification match the settings and identification stored in the external memories 50,52 of the cable harness 48. The module 30 may communicate a warning message indicating that the battery failed its initial capacity check, which may happen if, for example, the battery was used and not allowed sufficient time to recharge or if the battery was stored or is being used under extreme temperature conditions. The user may acknowledge this error and continue operation, but available backup power capacity may be less than required minimum levels. When Pre-Flight Mode is complete, the module 30 transitions to Flight Mode.

Figure 10:
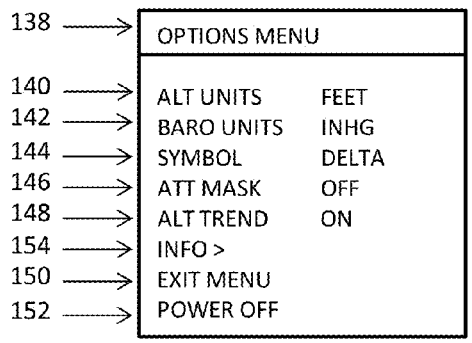
FIGS. 10-19 are screen captures of menus, submenus, and functions shown on the first or second displays of the module of FIG. 1.
Figure 11:
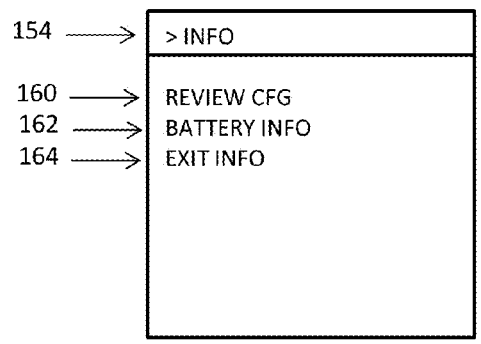
Figure 12:
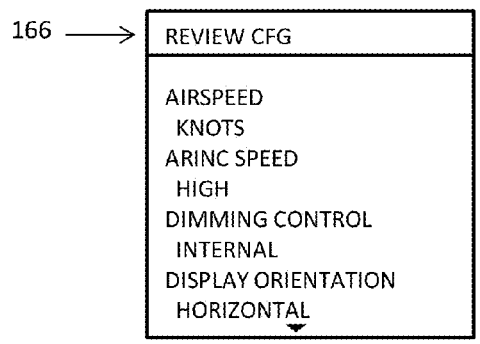
Figure 13:
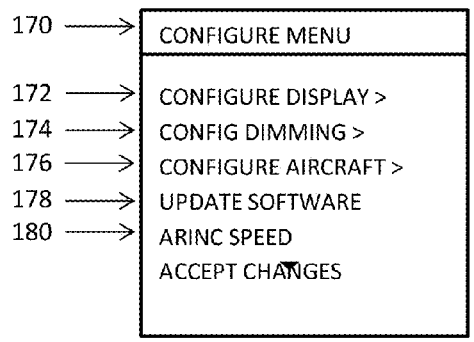
Figure 14:
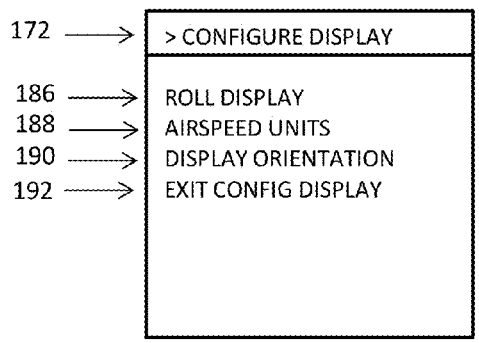
Figure 15:
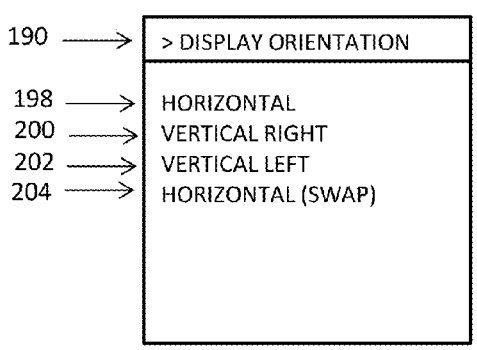
Figure 16:
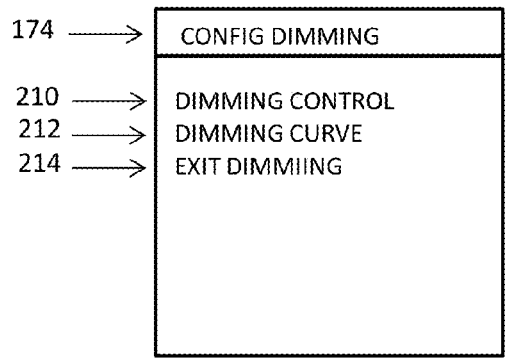

In Flight Mode the module 30 operates normally by displaying the attitude, altitude, airspeed, and slip indicators 64,90,108,124. Referring to FIGS. 10, 11, and 12, an Options Menu 138 and a brightness adjustment are also accessible in Flight Mode. The Options Menu 138 provides access to functions that do not affect the aircraft-specific configuration of the unit (these will generally be set in Configuration Mode by authorized personnel during installation and/or maintenance). These functions are accessible for convenience, preference, or potentially necessary in-flight adjustments. The Options Menu 138 can be accessed by pushing and holding the control knob 36 for a short period of time (e.g., approximately two seconds). In one implementation, the Options Menu 138 appears in place of the attitude and slip indicators 64,124, and the module 30 reverts to the active attitude and slip indicators 64,124 if no user input is received for a short period of time (e.g., ten seconds). Turning the control knob 36 causes the menu 138 to scroll through its various functions, with each function being highlighted in turn. The currently set value for each menu function may be displayed to the right of each setting. Pressing the control knob 36 for any highlighted function activates the function and makes its options available to the right. Turning the control knob 36 scrolls to the desired option, and pressing the control knob 36 selects it. Once the setting is changed, it becomes the currently set value for that function. After confirming any setting by selecting it, that setting will become active and be saved in the internal and external memories, regardless of whether the exit command is selected or whether the function times-out and automatically reverts to the attitude and slip indicators 64,124.

The Option Menu 138 root menu contains the following functions: ALT UNITS 140, BARO UNITS 142, SYMBOL 144, ATT MASK 146, ALT TREND 148, EXIT MENU 150, and POWER OFF 152. The Options Menu 138 also contains an INFO submenu 154. The ALT UNITS function 140 allows the user to set the altitude units to either feet or meters. This feature may be used during flight if, for example, the aircraft crosses territorial airspace boundaries that require or report different altitude units. The BARO UNITS function 142 allows the user to set the altimeter or altitude barometric adjustment units to either inches of mercury (Hg) or millibars/hectopascals (mbar/hPa). This feature may be used during flight if, for example, the aircraft crosses airspace boundaries that require or report different barometric units. The SYMBOL function 144 allows the user to set the type of symbolic airplane on the attitude display to either delta or traditional. This feature may be used, for example, to satisfy the user's preference or to match the display to the primary instruments. The ATT MASK function 146 allows the user to turn the attitude mask on or off. The attitude mask provides gradient dimming of the corners of the attitude display to give the aesthetic appearance of a round instrument. The ALT TREND function 148 allows the user to turn the altitude trend bar 98 on or off. The altitude trend bar 98 provides a graphical representation of vertical speed near the altitude tape 94 for the pilot's convenience. The EXIT MENU function 150 allows the user to manually exit the Options Menu 138 and return to the active attitude and slip indicators 64,124. After confirming any setting by selecting it, that setting becomes active and is saved in memory. This will occur regardless of whether the EXIT MENU function 150 is selected or whether it times-out after ten seconds of inactivity (and automatically reverts to the attitude display). The POWER OFF function 152 allows the user to immediately turn the module 30 off when it is operating on its internal battery 54 and there is little (e.g., less than 30 knots) or no airspeed detected. This feature allows for manually turning off the module 30 when the aircraft is on the ground or if the module 30 is inadvertently left on internal battery power, and is typically unavailable in Flight Mode.

The INFO sub-menu 154 contains the following functions: REVIEW CFG 160, BATTERY INFO 162, and EXIT INFO 164. The REVIEW CFG function 160 allows the user to view all of the values which were set in Configuration Mode during installation or maintenance and saved in the module's memories. This feature provides a read-only verification of information, and does not allow for changing it. When the REVIEW CFG function 160 is selected, a REVIEW CONFIG screen 166 appears and allows the user to scroll through all the configuration values. Pushing the control knob 36 returns the user to the INFO sub-menu 154. The BATTERY INFO function 162 provides the user with the real-time status of the internal battery 54, including the estimated run time in minutes, the temperature in Celsius, the current state of charge as a percentage of full, and the battery capacity in milliamp-hours.

Emergency Mode is initiated when primary power to the module 30 is lost, and results in the module 30 continuing to operate in Flight Mode while drawing power from the internal battery 54. The transition from Flight Mode to Emergency Mode is substantially seamless in that the communication of information to the pilot or other crew is substantially uninterrupted. Thus, the module 30 reliably continues to provide situational awareness information even after the aircraft's power system fails.

Reliance on battery power may be indicated by a battery icon displayed on the attitude indicator 64. The icon may be green in color when the battery 54 is fully or substantially fully charged, and may transition to other colors (e.g., yellow or red) as the battery 54 depletes its charge. In one implementation, the icon is black with a superimposed red "X" when the battery 54 has a minimal remaining charge (e.g., 20%) or operating time (e.g., 10 minutes).

In one implementation, if power is lost on the ground the module 30 immediately begins operating on internal battery power. When this occurs as a result of normal landing and shut-down procedures, the module 30 recognizes a lack of airspeed and substantially automatically determines that the aircraft is on the ground. The module 30 then displays a warning message and initiates a sixty second countdown, and the module 30 substantially automatically turns itself off at the end of the countdown. Alternatively, the user can manually turn off the module 30 or keep it on by using the control knob 36 to select the corresponding options on the display. If the countdown is manually overridden and the module 30 kept on, it can be subsequently turned off by entering the Options Menu 138 and selecting the POWER OFF 152 function.

In Configuration Mode an authorized user can set, change, and save various configuration values, including values that are specific to the aircraft in which the module 30 is to be used. Certain user preferences and maintenance functions that are not changeable during flight can also be changed in Configuration Mode. These configuration settings are also saved to the external Configuration Module that is part of the aircraft's cable harness 48, which allows for removing the module 30 for service or replacement while still retaining the configuration settings associated with the aircraft.

In one implementation, the user enters Configuration Mode by pressing and holding the control knob 36 prior to applying power to the module 30. After one or more (e.g., 6) seconds, the user is instructed to continue holding the knob 36 to enter the Configuration Mode. After one or more additional seconds, an introduction screen appears and the knob 36 can be released. The CONFIGURE MENU menu 170 is displayed and contains the following functions and sub-menus: CONFIGURE DISPLAY 172, CONFIG DIMMING 174, CONFIGURE AIRCRAFT 176, UPGRADE SOFTWARE 178, ARINC SPEED 180, BATTERY INFORMATION, POWER OFF, ACCEPT CHANGES, and CANCEL CHANGES. In Configuration Mode, unlike in the Options Menu 138, any changes made to any settings will not be saved until the user selects ACCEPT CHANGES prior to exiting the Configuration Mode.

The CONFIGURE DISPLAY sub-menu 172 includes the following functions and sub-menus: ROLL DISPLAY 186, AIRSPEED UNITS 188, DISPLAY ORIENTATION 190, and EXIT 192. The ROLL DISPLAY function 186 allows the user to select either the Fixed Pointer or Fixed Scale function. Selecting the Fixed Pointer function results in the lower triangle pointer 70 generally pointing to the top of the display to represent the aircraft's position in relation to the pitch and roll scales 68,72, which contains the radial gradations and triangles on the attitude indicator 64, rotating with the horizon. Selecting the Fixed Scale function (also known as the "sky pointer" option) results in the roll scale 68 remaining fixed and the lower triangle pointer 70 rotating with the horizon. This function should be selected to match other attitude instruments in the panel for consistency and reduced work load and fatigue for the pilot when switching between instruments. The AIRSPEED UNITS function 188 allows the user to select airspeed units of knots, miles per hour (MPH), or kilometers per hour (KPH). This function should also be selected to match the other airspeed instruments in the panel. The DISPLAY ORIENTATION function 190 allows the user to select how the module 30 will be oriented in the instrument panel. In one implementation, the module 30 can be installed Horizontal 198 or Horizontal (Swap) 204 and Vertical Right 200 or Vertical Left 202. Under the Horizontal function 198, when the module 30 is oriented horizontally, the attitude indicator 64 defaults to the left display 32 and the module 30 will generally be installed with the control knob 36 at the bottom of the front of the module 30. The Horizontal (Swap) function 204 positions the attitude indicator 64 on the right display 34. Under the Vertical Right function 200, the control knob 36 is located on the right side of the front of the module 30. Under the Vertical Left function 202, the control knob 36 is located on the left side of the front of the module 30. These functions allow for increased flexibility of installation, but should be set to minimize visual scan and allow for easy access. Selecting EXIT 192 returns the user to the CONFIGURE MENU menu 170.

The CONFIG DIMMING sub-menu 174 includes the following functions: DIMMING CONTROL 210, DIMMING CURVE 212, and EXIT 214. The DIMMING CONTROL function 210 allows the user to select the source that controls the level of illumination. As discussed, the source can be external, such as the aircraft's adjustable lighting bus, or it can be internal, such as the photocell 60 which may be built into the module 30 and which senses the ambient light conditions and substantially automatically adjusts the brightness of the displays 32,34. The DIMMING CURVE function 212 allows the user to customize the response to the DIMMING CONTROL input, whether from an external or internal source, over its range of operation. More specifically, for various points throughout the input range, the brightness can be adjusted up or down to produce a customized dimming scheme that reflects the pilot's preferences or that closely matches the other instruments in the panel.

Figure 17:
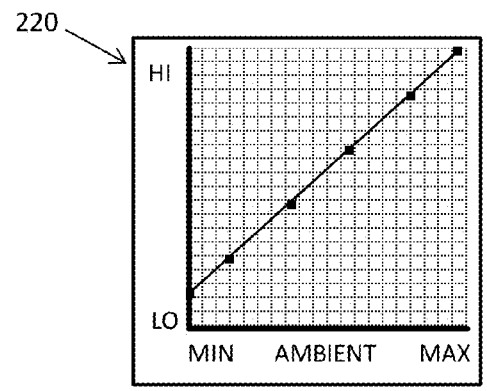

Referring specifically to FIG. 17, when setting the dimming curve 220 with dimming control provided by the photocell 60, the X-axis of the dimming graph will read "ambient" and will range from "min" to "max". This represents the brightness of the light the module's photocell 60 can sense and shows the current ambient light level with a vertical blue line. The Y-axis represents the brightness of the display 32,34 and will track the dimming curve 220 with the horizontal blue line as the sensed light level increases or decreases. The dimming curve 220 can be defined by (1) changing the light in the cockpit or general area around the module 30 until the vertical blue line matches or approximately matches the yellow highlighted point on the graph, (2) adjusting the control knob 36 to increase or decrease the brightness of the displays 32,34 to the desired level at that lighting condition (the point will move up or down, respectively), (3) when satisfied, pressing the control knob 36 to save the value, and (4) repeating these steps for each point on the slope of the graph. When setting the dimming curve 220 in this manner, it may be useful to simulate a range of lighting conditions, which may be more accurately done after the module 30 is installed in the aircraft.

Figure 18:
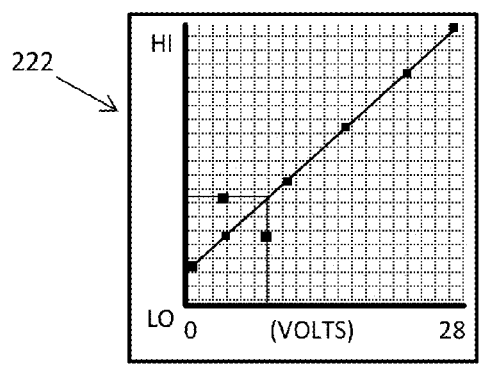
Figure 19:
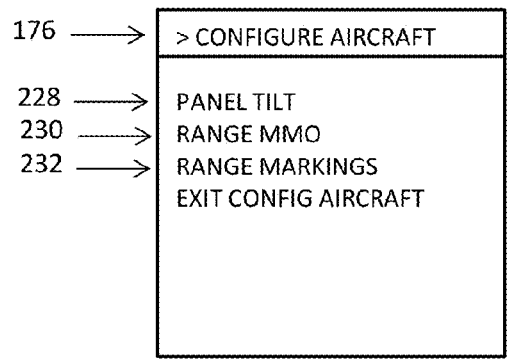

Referring specifically to FIG. 18, when setting the dimming curve 222 with the dimming control provided by an external source, the X-axis of the dimming graph will read "voltage" and will show a range from 0 to 5, 14, or 28. This represents the voltage input of the lighting bus and shows the current input with the vertical blue line. The Y-axis again represents the brightness of the display, and will track the dimming curve 222 with the horizontal blue line as the input voltage increases or decreases. With a lighting bus input, the dimming curve 222 includes a "low level output" function which allows the module 20 to be set to a high-brightness level to maintain daylight visibility when the lighting bus is turned down very low or off (as it may be during daylight hours). The dimming curve 222 can be partially defined by (1) changing the lighting bus input until the vertical blue line matches or approximately matches the yellow highlighted point on the graph, (2) adjusting the control knob 36 to increase or decrease the brightness of the displays 32,34 to the desired level at that lighting bus position (the point will move up or down, respectively), (3) when satisfied, pressing the control knob 36 to save the value, and (4) repeating the these steps for each point on the slope of the graph. The next highlighted point is on the vertical zero line. As the lighting bus is turned down or off, there may be a point at which it defaults to a set level (typically for daylight visibility). The user can adjust this dot horizontally with the control knob 36 to set the low-input level of the lighting bus at the point at which the default brightness takes effect, and then press the control knob 36 to save this value. The point at which this occurs can be verified by adjusting the lighting bus input. If this point is not set, the displays 32,34 will follow the dimming curve 222 previously programmed and will be respond to the position of the first point when the lighting bus is turned off. The final highlighted point sets the default low-input brightness. With the lighting bus input to the left of the previous set point, the user can adjust the brightness up or down to the desired level, and then press the control knob 36 to save the value. When setting the dimming curve 222 in this manner, it may be useful to simulate a range of lighting inputs or conditions to match the other instruments, which may be more accurately done after the module 30 is installed in the aircraft.

Whether internally or externally controlled, the level of illumination can be manually adjusted during Flight Mode. More specifically, the pilot or crew can override the current brightness setting and manually increase or decrease the brightness as necessary or desired. To manually adjust the brightness, the user briefly presses the control knob 36 to cause the brightness bar to appear overlaid on the attitude display, and then turns the control knob 36 to increase or decrease the current setting. (Note: Pressing the control knob for a longer period of time causes the Options Menu 138 to be displayed). While the module 30 remains powered, the manual illumination adjustment remains saved and any change in the lighting bus or photocell sensor will increase or decrease the brightness from the newly set manual adjustment point. When the module 30 is powered off, the manual adjustment is reset and defaults to the lighting response curve programmed into memory in Configuration Mode.

The CONFIGURE AIRCRAFT sub-menu 176 includes the following functions: PANEL TILT 228, RANGE MMO 230, RANGE MARKINGS 232, and EXIT. The PANEL TILT function 228 allows the user to input the mounting angle of the module 30, which may be approximately between −90 degrees and +90 degrees, or approximately between −10 degrees and +90 degrees, so that the attitude indicator 64 indicates a pitch of zero when the aircraft is in level flight. The panel-tilt angle can be measured with a digital level or similar device to within approximately +/−1 degree, or approximately +/−0.5 degrees, of level. The control knob 36 can be used to change the value of each digit of the panel-tilt angle. The RANGE MMO function 230 allows the user to input the maximum operating Mach number (MMO) for the aircraft. This may be represented by a moving red and white striped ("barber pole") color bar near the airspeed indicator 108, which adjusts with varying airspeed and altitude. This value may be zero for aircraft for which there is no published MMO. The control knob 36 can be used to change the value of each digit of the MMO.

Figure 20:
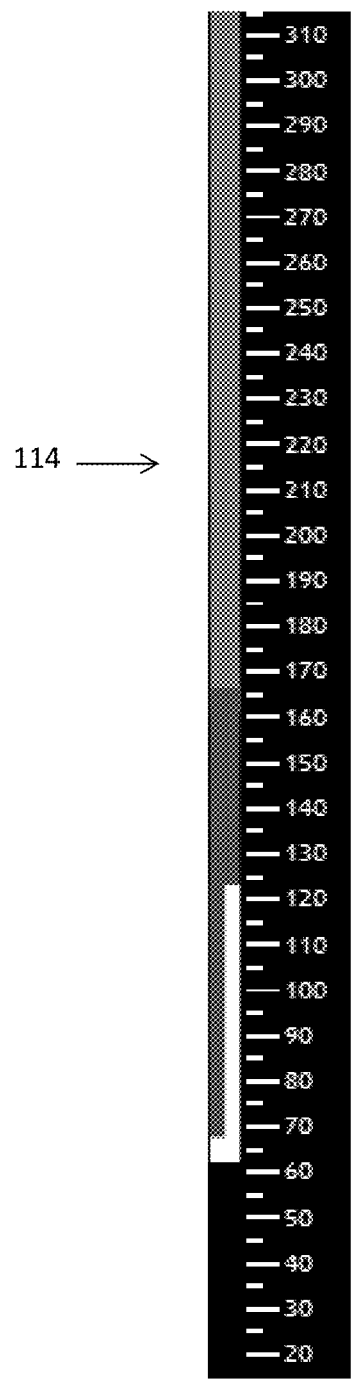
FIG. 20 is a screen capture of a range markings color bar feature that is part of the screen capture of airspeed information of FIG. 9.

The RANGE MARKINGS function 232 allows the user to input airspeed limits (or "V-speeds") for the aircraft. Referring specifically to FIGS. 9 and 20, the range markings 114 for airspeed limits may appear as a series of colored bars to the left of the airspeed indicator 108. The range markings 114 can be programmed by: (1) Using the control knob 36 to select the type of the color bar (e.g., HALF, FULL, or RAD (radial)); (2) selecting the desired color (e.g., blue, green, red, white, yellow, or BAR (barber pole)); (3) selecting each digit of the range value, wherein the first three digits are the start or lower limit (V1) of the color bar range and the second three digits are the upper limit (V2), wherein selecting RAD (radial) causes V1 and V2 to be the same value, selecting MAX or inputting "999" causes the V2 column to extend the bar to the top of the scale, selecting FULL or BAR (barber pole) type causes V2 to default to MAX, and inputting "000" for the lower and upper limit results in no color bar being displayed; and (4) continuing in sequence until reaching the EXIT prompt and then pressing the control knob 36 to exit the menu. In one implementation, the pilot or other crewmember is able to set the range markings 114, including choosing the colors and determining the position of each color within the bar, based on a consideration, such as personal preference, that is substantially independent of the aircraft's type.

The UPGRADE SOFTWARE function 178 causes the module 30 to look for a software upgrade on the portable memory device that has been plugged into the port interface 42. This function may not be available in Emergency Mode (i.e., when the module 30 is operating on battery power). If the module 30 does not detect such a device or find a valid software upgrade file, a failure message appears and the module 30 returns to the Configuration Menu. If the module 30 does find a valid software upgrade file, a software upgrade progress screen appears and indicates when the software upgrade is successfully completed. If the user acknowledges this completion, the module 30 will automatically reset, return to Pre-Flight Mode, and then enter Flight Mode. The ARINC SPEED function 180 allows the user to select either LOW or HIGH speed data communication. This function configures the module's ability to output data using ARINC 429. The control knob 36 can be used to select the speed appropriate for the equipment that will receive the data.

Selecting the ACCEPT CHANGES function causes all settings and changes made while in Configuration Mode to be saved into both the module's internal memories 38,40 and the cable harness' external memories 50,52. Settings and changes may not be saved unless ACCEPT CHANGES is selected. After ACCEPT CHANGES is selected, the module 30 will automatically reset, return to Preflight Mode, and then enter Flight Mode. Selecting the CANCEL CHANGES function causes any settings or changes made while in Configuration Mode to be canceled and not saved. After CANCEL CHANGES is selected, the module 30 will automatically reset, return to Pre-flight Mode, and enter Flight Mode.

The module's performance limits are based on the range of aircraft into which it may be installed. For example, performance limits for some implementations may include no limit to pitch angle (360+ degrees), 300 degrees per second maximum pitch rate, no limit to roll angle (360+ degrees), 300 degrees per second maximum roll rate, −1,500 to +55,000 feet of altitude, 28 to 31 inches of mercury (or milliBars) of barometric pressure, and 30 to 500 knots (or miles-per-hour or kilometers-per-hour) of airspeed.

The module's certifications are also based on the range of aircraft into which it may be installed. For example, certifications for some implementations may include FAA TSO-C2d (Type B), C3e, C4c, C10b, C106, C113a, C179a EASA ETSO-C2d, C3d, C4c, C10b, C106, C113, C179a; environmental qualifications include RTCA DO-160G Environmental Category as noted in Table 1; software qualifications of RTCA DO-178B, Design Assurance Level A; and complex hardware qualifications include RTCA DO-254, Design Assurance Level A. Following is Table 1, which includes operational features and parameters contributing to the various certifications.

TABLE 1

| ELECTRICAL ATTRIBUTES | | |
|---|---|---|
| Characteristics | | |
| Input Voltage: | | 10-32 VDC |
| Input Power: | (nominal) | 6 watts (0.22 A @ 28 VDC) |
| | (maximum) | 25 watts max (when charging and heating battery) |
| Lighting Input: | | 5, 14, or 28 VDC or automatic photocell control |
| Input Data: | | barometer synchronization via ARINC 429 |
| Output Data: | | attitude, altitude, airspeed via ARINC 429 discrete valid signal to ground; invalid signal is open (pin 2) |

| PHYSICAL ATTRIBUTES | |
|---|---|
| Characteristics | |
| Weight: | 1.6 pounds (0.73 kg) |
| Dimensions: (without connectors, mates & knob) | Benzel: 2.37" × 5.50" × 0.33" (H × W × D) Chassis: 2.31" × 3/16" × 4.82" (H × W × D) |
| Mating Connectors: | 15-pin D-Sub with Configuration Module, MCIA p/n 9017275 Pneumatic fittings, MCIA p/n 9017642 |
| Mounting: | Panel mount from front; uses (4) #6-32 cap screws and MCIA p/n 9017490-2 Nutplate (included) |

| PERFORMANCE LIMITS | | |
|---|---|---|
| Characteristics | | |
| Attitude: | Pitch Angle | No limits (360°+) |
| | Pitch Rate | 300° per second max |
| | Roll Angle | No limits (360°+) |
| | Roll Rate | 300° per second max |
| Altitude: | Range | −1,500 to +55,000 feet (available in meters) |
| | Barometer | 28.00 to 31.00 inches of mercury (available in mB) |
| Airspeed: | Range | 30 to 500 knots (available in mph or kph) |

| QUALIFICATIONS | |
|---|---|
| Specifications | |
| Certifications: | FAA TSO-C2d (Type B), C3e, C4c, C10b, C106, C113a, C179a EASA ETSO-C2d, C3d, C4c, C10b, C106, C113, C179a |
| Environmental Qualifications: | RTCA DO-160G Environmental Category F1(S2)AB[(RBB1)(UG)]XXXXXXZ(ZXX)AZ(ZC)[WF]P[B3H3L3)XXAX |
| Software Qualifications: | RTCA DO-178B, Design Assurance Level A |
| Complex Hardware Qualification: | RTCA DO-254, Design Assurance Level A |

Although the invention has been disclosed with reference to various particular embodiments and implementations, it is understood that equivalents may be employed and substitutions made without departing from the contemplated scope of the invention.

The invention claimed is:

1. An instrumentation module for an aircraft, the instrumentation module comprising:
an electronic display screen displaying an electronic indicator of at least one aircraft condition;
the electronic display screen having an actual mounting orientation selected from among a plurality of selectable mounting orientations within the aircraft;
the electronic indicator having an actual display orientation selected from among a plurality of selectable display orientations on the electronic display;
a manual control device allowing manual selection of the actual display orientation of the electronic indicator from among the plurality of selectable display orientations so that the actual display orientation of the electronic indicator corresponds to the actual mounting orientation of the electronic display screen;
wherein the instrumentation module includes:
first and second electronic display screens, wherein in one of the plurality of selectable mounting orientations the first electronic display screen is positioned horizontally adjacent to the second electronic display screen, and in the other of the plurality of selectable mounting orientations the first electronic display screen is positioned vertically adjacent to the second electronic display screen;
first and second electronic indicators having an actual display orientation selected from among a plurality of selectable display orientations on the first and second electronic displays, wherein one of the first and second electronic indicators is displayed on one of the first and second display screens and the other of the first and second electronic indicators is displayed on the other of the first and second display screens;
wherein the manual control device allows manual selection of:
which of the first and second electronic indicators is displayed on which of the first and second display screens; and
the actual display orientation of the first and second electronic indicators on the first and second display screens.

2. An instrumentation module for an aircraft, the instrumentation module comprising:
first and second electronic display screens displaying first and second electronic indicator of at least one condition of the aircraft, wherein the at least one aircraft condition is selected from the group consisting of: attitude, altitude, airspeed, and slip,
the first and second electronic display screens having an actual mounting orientation selected from among a plurality of selectable mounting orientations within the aircraft, wherein in one of the plurality of selectable mounting orientations the first electronic display screen is positioned horizontally adjacent to the second electronic display screen, and in the other of the plurality of selectable mounting orientations the first electronic display screen is positioned vertically adjacent to the second electronic display screen, and
the first and second electronic indicators having an actual display orientation selected from among a plurality of selectable display orientations on the first and second electronic displays, wherein one of the first and second electronic indicators is displayed on one of the first and second display screens and the other of the first and second electronic indicators is displayed on the other of the first and second display screens; and
a manual control device allowing selection of—
which of the first and second electronic indicators is displayed on which of the first and second display screens, and
the actual display orientation of the first and second electronic indicators on the first and second display screens.

3. The instrumentation module as set forth in claim 2, wherein the instrumentation module is operable for fixed-wing and rotary wing aircraft.

4. The instrumentation module as set forth in claim 2, wherein the manual control device consists of a pushable and turnable knob receiving manual input by being pushed and receiving manual input by being turned.

5. A method of installing an instrumentation module in an aircraft, wherein the instrumentation module has an electronic display screen displaying an electronic indicator of at least one aircraft condition, the method comprising the steps of:
mounting the instrumentation module such that the electronic display screen is in an actual mounting orientation selected from among a plurality of selectable mounting orientations, wherein the instrumentation module includes:
first and second electronic display screens, wherein in one of the plurality of selectable mounting orientations the first electronic display screen is positioned horizontally adjacent to the second electronic display screen, and in another of the plurality of selectable mounting orientations the first electronic display screen is positioned vertically adjacent to the second electronic display screen; and
first and second electronic indicators having an actual display orientation selected from among a plurality of selectable display orientations on the first and second electronic displays, wherein one of the first and second electronic indicators is displayed on one of the first and second display screens and the other of the first and second electronic indicators is displayed on the other of the first and second display screens;
manually changing a display orientation of the electronic indicator to reflect the actual mounting orientation of the electronic display screen;
manually changing which of the first and second electronic indicators is displayed on which of the first and second electronic display screens; and
manually changing the actual display orientation of the first and second electronic indicators on the first and second electronic display screens.

6. An instrumentation module for an aircraft, the instrumentation module comprising:
an electronic display screen displaying an electronic indicator of at least one aircraft condition;
the electronic display screen having an actual mounting orientation selected from among a plurality of selectable mounting orientations within the aircraft;
the electronic indicator having an actual display orientation selected from among a plurality of selectable display orientations on the electronic display;
a manual control device allowing manual selection of the actual display orientation of the electronic indicator from among the plurality of selectable display orientations so that the actual display orientation of the electronic indicator corresponds to the actual mounting orientation of the electronic display screen;
a first internal memory storing a first copy of the data;
a second internal memory storing a second copy of the data;
an interface facilitating a change to the first copy of the data; and
a decision-making component deciding whether the change to the first copy of the data was completed;
wherein if the change to the first copy of the data was completed, writing the first copy of the data over the second copy of the data; and
wherein if the change to the first copy of the data was not completed, writing the second copy of data over the first copy of the data.

7. An instrumentation module for an aircraft, the instrumentation module comprising:
an electronic display screen displaying an electronic indicator of at least one aircraft condition:
the electronic display screen having an actual mounting orientation selected from among a plurality of selectable mounting orientations within the aircraft;
the electronic indicator having an actual display orientation selected from among a plurality of selectable display orientations on the electronic display;
a manual control device allowing manual selection of the actual display orientation of the electronic indicator from among the plurality of selectable display orientations so that the actual display orientation of the electronic indicator corresponds to the actual mounting orientation of the electronic display screen;
a first internal memory storing certified software, wherein the certified software in operable for use in a certified system for the aircraft;
a second internal memory storing non-certified software, wherein the non-certified software is not operable for use in the certified system for use in the aircraft; and
wherein the certified software is partitioned from the non-certified software.

8. An instrumentation module for an aircraft, the instrumentation module comprising:
an electronic display screen displaying an electronic indicator of at least one aircraft condition;
the electronic display screen having an actual mounting orientation selected from among a plurality of selectable mounting orientations within the aircraft;
the electronic indicator having an actual display orientation selected from among a plurality of selectable display orientations on the electronic display;
a manual control device allowing manual selection of the actual display orientation of the electronic indicator from among the plurality of selectable display orientations so that the actual display orientation of the electronic indicator corresponds to the actual mounting orientation of the electronic display screen;
an interface connecting the instrumentation module to a primary instrumentation system of the aircraft;
wherein the primary instrumentation system determines a first altitude and a barometric pressure and, based thereon, calculates a first barometrically-corrected altitude;
an altitude-determining component determining a second altitude, wherein the second altitude is approximately the same as the first altitude;
a first calculating component receiving the first altitude and the first barometrically-corrected altitude from the primary instrumentation system via the interface, and, based thereon, calculating the barometric pressure; and
a second calculating component receiving the second altitude and the calculated barometric pressure and calculating a second barometrically-corrected altitude, wherein the second barometrically-corrected altitude is approximately the same as the first barometrically-corrected altitude.

9. An instrumentation module for an aircraft, the instrumentation module comprising:
an electronic display screen displaying an electronic indicator of a condition of the aircraft;
the electronic indicator including:
a current value for the condition of the aircraft and a range of possible values for the condition of the aircraft;
a bar extending alongside the range of possible values for the condition of the aircraft, wherein the bar includes a plurality of colors, each color being associated with and communicating information about a sub-range of the range of possible values for the condition of the aircraft; and
a manual control device allowing a user to manually choose the plurality of colors and to determine a position of each color within the bar to correspond to a particular sub-range of the range of possible values for the condition of the aircraft;
the electronic display screen having an actual mounting orientation selected from among a plurality of selectable mounting orientations within the aircraft;
the electronic indicator having an actual display orientation selected from among a plurality of selectable display orientations on the electronic display; and
the manual control device allowing manual selection of the actual display orientation of the electronic indicator from among the plurality of selectable display orientations so that the actual display orientation of the electronic indicator corresponds to the actual mounting orientation of the electronic display screen.

* * * * *